United States Patent
Baumann

(10) Patent No.: US 8,423,178 B2
(45) Date of Patent: Apr. 16, 2013

(54) METHOD AND DEVICE FOR AUTOMATED COMMISSIONING OF BUNDLES

(75) Inventor: Michael Baumann, Unterfoehring (DE)

(73) Assignee: Kuka Roboter GmbH, Augsburg (DE)

( * ) Notice: Subject to any disclaimer, the term of this patent is extended or adjusted under 35 U.S.C. 154(b) by 0 days.

(21) Appl. No.: 12/958,648

(22) Filed: Dec. 2, 2010

(65) Prior Publication Data

US 2011/0130868 A1    Jun. 2, 2011

(30) Foreign Application Priority Data

Dec. 2, 2009    (DE) .......................... 10 2009 056 639

(51) Int. Cl.
G06F 7/00    (2006.01)

(52) U.S. Cl.
USPC ........... 700/217; 414/788; 414/270; 414/799; 414/790.9; 414/801; 700/228

(58) Field of Classification Search .................... 700/217
See application file for complete search history.

(56) References Cited

U.S. PATENT DOCUMENTS

| | | | | |
|---|---|---|---|---|
| 3,836,018 A * | 9/1974 | Dawson et al. | ............ | 414/790.9 |
| 4,037,734 A * | 7/1977 | Erdman | ...................... | 414/796.4 |
| 4,988,264 A * | 1/1991 | Winski | .......................... | 414/796 |
| 5,096,367 A * | 3/1992 | Winski | .......................... | 414/801 |
| 5,933,354 A * | 8/1999 | Shimada et al. | .............. | 700/228 |
| 5,934,413 A | 8/1999 | Konig et al. | | |
| 7,097,045 B2 * | 8/2006 | Winkler | ........................ | 209/630 |
| 8,074,431 B1 * | 12/2011 | Pierson et al. | ................... | 53/529 |
| 2004/0074823 A1 * | 4/2004 | Brust et al. | ...................... | 209/586 |
| 2005/0125101 A1 * | 6/2005 | Brust et al. | ...................... | 700/245 |
| 2007/0280814 A1 * | 12/2007 | Morency et al. | .............. | 414/788 |
| 2008/0118340 A1 * | 5/2008 | Baumstimler | ................ | 414/799 |
| 2008/0267759 A1 | 10/2008 | Morency et al. | | |
| 2009/0266676 A1 | 10/2009 | Eschlbeck et al. | | |
| 2010/0158647 A1 * | 6/2010 | Lafontaine | .................... | 414/270 |
| 2010/0228385 A1 * | 9/2010 | Beck et al. | ..................... | 700/217 |
| 2011/0061992 A1 | 3/2011 | Wünsche et al. | | |

FOREIGN PATENT DOCUMENTS

| | | |
|---|---|---|
| DE | 2 062 845 A | 7/1972 |
| DE | 24 29 699 A1 | 1/1976 |
| DE | 295 03 899 U1 | 7/1995 |
| EP | 1 231 163 A1 | 8/2002 |
| WO | WO 2008/068264 | 6/2008 |
| WO | WO 20081068264 A1 | 6/2008 |
| WO | WO 2011/006597 A1 | 1/2011 |

* cited by examiner

*Primary Examiner* — Gene Crawford
*Assistant Examiner* — Kyle Logan
(74) *Attorney, Agent, or Firm* — Schiff Hardin LLP

(57) ABSTRACT

A method for automated commissioning of bundles includes providing different source palettes and palettizing at least one target palette, with bundle layers of different source palettes being individualized and/or magazined in alternation and/or with variable predetermination, and/or bundles or bundle groups being magazined and/or demagazined in stacks before palettizing of the target palette, and/or the target palette is selectively palettized with at least one non-individualized bundle layer of a source palette.

19 Claims, 2 Drawing Sheets

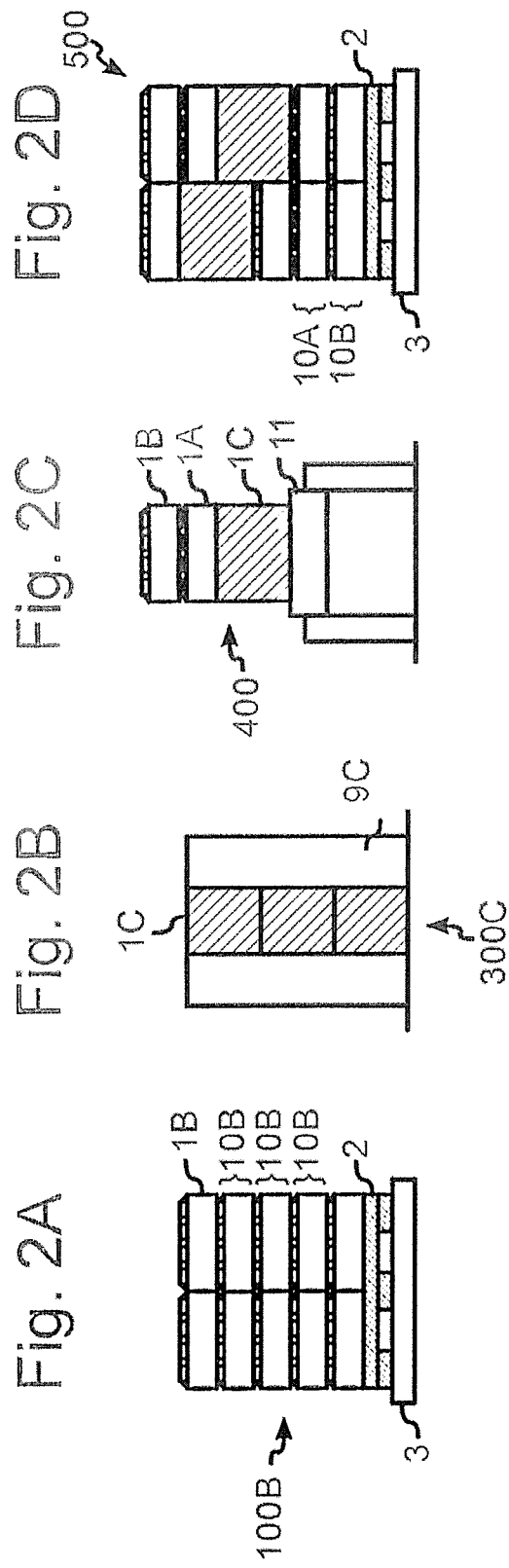

METHOD AND DEVICE FOR AUTOMATED COMMISSIONING OF BUNDLES

BACKGROUND OF THE INVENTION

1. Field of the Invention

The present invention concerns a method and a device for automated commissioning of bundles, in particular for mixed palettizing of target palettes from different, homogeneous source palettes.

2. Description of the Prior Art

In a number of fields—for example manufacturing of or wholesale or intermediary trading or mail order selling of foodstuffs (in particular beverages, dairy products, luxury foods), replacement and accessory parts and industrial, convenience and domestic products—goods exist in homogeneous source palettes with similar bundles, for example beverage crates or yogurt crates of the same flavor. Mixed palettes are assembled from these that—depending on the task—contain diverse, different bundles that differ in type, size or the like.

A homogeneous source palette is typically initially completely individualized and its bundles are magazined in separate temporary storage locations. It is disadvantageous that very large buffers must be used for this in order to be able to accommodate all bundles of a homogeneous source palette. Since at least one temporary storage location must be provided for each bundle type for mixed pelletizing, such systems are not only inflexible but also have a large space requirement.

DE 10 2006 057 758 A1 proposes to load autarchic (autonomous; independent) transport vehicles from homogeneous bundle layers that exist in high rise racks and to create the target palettes from the transport vehicles.

A method and a device for resorting general cargo collections are known from DE 10 2008 020 622 A1. Bundle combinations are thereby broken up by different loading [population] devices via a transportation unit and distributed to associated conveyor belts that serve as bundle buffers from which target palettes are palettized. Here as well as large space requirement and a poor system flexibility disadvantageously result.

SUMMARY OF THE INVENTION

It is the object of the present invention to improve the automated commissioning of bundles and to remedy or reduce at least one of the aforementioned disadvantages.

According to the invention, different, advantageously homogeneous source palettes are provided and one or more target palettes are palettized serially and/or in parallel for automated commissioning of bundles.

A bundle in the sense of the present invention can be a packaged or unpackaged piece of general cargo (goods) or a combination of goods, for example a box, a carton or a crate with bulk goods or multiple individual goods, for instance beverage bottles, dairy product containers or the like. A group of bundles arranged next to one another and/or one after the other horizontally is designated as a bundle layer. A palette accordingly designates a number of vertically stacked bundle layers, advantageously including a support for handling (for example what is known as a transport palette such as the industrial or Europalettes EUR, EUR 2, EUR 3 and the like). For uniformity, an empty support is accordingly designated as an empty palette (i.e. with zero vertically stacked bundle layers). A homogeneous (bundle) layer or palette contains only bundles of the same type, for example only identical goods. A palette with different, but individually homogeneous layers is designated as a palette that is homogeneous per layer or a "rainbow palette". Bundles layered atop one another vertically are designated as stacks or as stacked. A bundle group is a number of mutually handled bundles arranged next to and/or behind one another. Such a bundle group can always be considered in the following instead of a single bundle even though for the most part a bundle is discussed for a more compact depiction.

According to a first aspect of the present invention, predetermined bundle layers of different source palettes are alternately and/or variably individualized (broken down) and magazined before an (advantageously mixed) target palette is palettized with these bundles.

As used herein, an individualization is the separation and/or reorientation of bundles or, respectively, bundle groups of a bundle layer or group relative to one another. In a preferred embodiment this occurs via a single or multi-stage raising of bundle layers or groups by means of velocity and/or direction changes and/or deflectors (gates) in conveyor systems (for example mesh chain conveyors) and/or by means of corresponding grippers, for example as are described in German Patent Application 10 2009 011 299. The intermediate depositing of bundles that were separated from a source palette before they are palettized on a target palette is designated as "magazining"; a storage device to accommodate these bundles is accordingly designated as a magazine. A placement area can inasmuch already represent a magazine in the sense of the present invention. However, a magazine preferably stores bundles positively and/or non-positively, for example via corresponding lateral frames, guides or springs. A demagazining accordingly describes the removal of bundles from magazines.

As used herein, an alternating individualization means that only a portion of the bundle layers of a first source palette (in particular a first bundle layer of a first source palette) and subsequently one or more bundle layers of a second source palette are individualized before additional bundle layers of the first or a third source palette are individualized. A variably provided individualization can take place automatically depending on the fill degree of an associated magazine and/or depending on the need or palettizing pattern for a target palette.

Relative to the prior art, according to which all bundles of a source palette must typically be respectively, completely individualized and distributed to corresponding magazines before the next source palette is processed, the alternating and/or variably provided individualization and magazining reduces the number of bundles to be handled in the system or reduces its components (for example conveyors and magazines). In particular, bundles can remain in their only partially individualized source palette as long as one or more corresponding magazines are still sufficiently filled. In this way short-term requirements can be reacted to more flexibly. In particular, smaller and, correspondingly, advantageously more magazines can also be provided for more bundle types.

According to a second aspect of the present invention that is preferably combined with the first aspect explained in the preceding, individual bundles or bundles stacked as bundle groups are magazined and/or demagazined before an (advantageously mixed) target palette is palettized with these bundles. In particular a magazining in a stack (i.e. the vertical layering of bundles) and/or the handling as a stack (i.e. multiple, vertically layered bundles together, for example by means of a column gripper) designated as "stacked magazining".

In contrast to the prior art explained in the preceding, this allows not only the magazining in a smaller horizontal space but in a preferred embodiment can also reduce the handling times since a gripper that handles multiple stacked bundles together saves on travel paths.

For example, for this purpose bundles or bundle groups can be stacked before their magazining and thus be supplied together (and therefore faster) to a magazine. For example, bundles can thereby already be stacked atop one another by a gripper by a stacking station before take-up and/or be stacked one atop one another on additional bundles (in particular following in a transport direction) by transferring the gripper with gripped bundles and can be subsequently deposited in the magazine.

Additionally or alternatively, bundles can be stacked in one or multiple stages in an analogous manner in the demagazining and thus be palettized as a stack or, respectively, tower on the target palette. For example, in a first stacking stage a gripper can successively take up multiple bundles from different magazines and thus compose mixed stacks that can then as partial elements be loaded completely onto a target palette or, in a second stacking stage, can for their part be merged or combined with other partial stacks.

While the magazining advantageously ensues homogeneously in order to fill magazines with bundles of the same type, the demagazining can preferably take place in a mixed manner in order to prepare mixed stacks and provide them for palettizing on the target palettes.

According to a third aspect of the present invention that is preferably combined with the first and/or second aspect explained in the preceding, a target palette with individualized bundles is also selectively palettized with at least one bundle layer that has not been individualized. In particular, one or more layers of a source palette can be lifted from this, and the layer or layers is/are then selectively additionally individualized or completely palettized on a target palette, meaning that a layer commissioning feeds a single bundle commissioning.

In contrast to the prior art illustrated above, in which source palettes are always completely individualized, the selective palettizing of one or more bundle layers that have not been individualized allows target palettes that possess bundle layers that corresponding to bundle layers of a source palette (in particular what are known as rainbow palettes) to be palettized more quickly. The target palette can thereby possess exclusively un-individualized source palette layers, in particular homogeneous layers. Such layers can similarly also be combined as start, intermediate or end layers with other target bundle layers that contain bundles individualized from different source palettes.

In a preferred embodiment of the present invention according to at least one of the three aspects explained in the preceding, different source palettes are provided horizontally and/or behind one another in a layer commissioning module, which in particular can facilitate a selective access to a plurality of source palettes.

The provisioning can in particular take place by means of a floor-level conveyor technique, for example by means of single or multiple distribution or, respectively, displacement carts on which one or more source palettes are to be conveyed to predetermined palette storage positions (for example by means of telescoping forks). In particular in order to save space for the travel paths of such displacement carts, the provision can additionally or alternatively take place by means of a portal transport technique, for example via a palette jack that can be moved across the source palettes that advantageously at least partially encompasses and/or engages below the palettes. Target palettes can additionally or alternatively also be moved in the same manner (for example by means of displacement carts or palette jacks).

Additionally or alternatively, source palettes can also be provided in alternation. In particular, source palettes can be provided as needed in the layer commissioning module—advantageously corresponding to an advance planning—when one or more bundle layers should be individualized and magazined in order to fill corresponding magazines and/or to be palettized on target palettes without individualization. If they are not needed, source palettes can be removed again from the layer commissioning module and, for example, be transported into a high rack, block or buffer storage until they are provided again. At least one corresponding source palette is advantageously provided in parallel for each bundle type to be commissioned in order to operate the corresponding magazine or provide un-individualized layers as needed. A demand-oriented provision is similarly possible, for example such that source palettes which have been accessed more frequently in the past or on average (what are known as A and/or B source palettes) are provided continuously or with higher priority while source palettes which are probably accessed less often (what are known as C and/or D source palettes) are provided only temporarily or with lower priority.

In a preferred embodiment bundles, bundle stacks, bundle layers and/or empty palettes are handled by means of a portal transport technique, in particular grippers that are stored at portals that can be moved over the palettes. Grippers for the handling of bundles, bundle stacks, bundle layers and/or empty palettes can thereby be connected with the portal or on a set environment basis via a single- or multiple-joint manipulator—in particular a multiple-axis robot, especially a six-axis robot—in order to improve the handling.

For example, bundles or bundle stacks can be gripped by means of column grippers that can advantageously affix two or more bundles stacked one atop the other together. Layer grippers—for example retractor grippers or suction grippers—can take up one or more complete bundle layers from source palettes and deposit them on target palettes or individualization devices. In a preferred embodiment, a layer gripper can advantageously also handle a support or, respectively, a transport palette (preferably by means of electrically operable hooks) together with one or more bundle layers. Such a gripper can thus take up the support of a source palette and deposit it on a deposition location for empty supports or onto the empty supports already deposited there and—insofar as it simultaneously has gripped one or more bundle layers—can subsequently bring these to their destination in order to thus reduce travel time and route.

Bundles or bundle stacks can also be similarly handled by means of a floor transport technique, in particular with part conveyors and/or continuous conveyors. For example, these can (further) raise (partial) bundle layers, stack them or advantageously transport them already stacked. In addition to lifting via velocity and/or direction changes of conveyors, communicating continuous conveyors with different velocities or that are oriented at corners as well as switchable deflectors can possess an individualization device as well as positioning devices (for example grippers or shifters) to displace and/or reorient bundles on such conveyors.

In a preferred embodiment, the capacity of a magazining device for stacked magazining of bundles can be variably predetermined in order to adapt it to changing demand and in particular to control an automatic refilling and a corresponding provisioning of source palettes.

A method according to the invention for automated commissioning of bundles can thus in particular comprise the steps: provide different source palettes and palettizing of at least one target palette, wherein bundle layers of different source palettes are individualized and magazined in alternation or with a variable, predetermined order, and/or bundles or bundle groups, already stacked, are magazined and/or demagazined before the palettizing of a target palette, and/or a target palette is selectively palettized with at least one un-individualized bundle layer of a source palette.

BRIEF DESCRIPTION OF THE DRAWINGS

FIGS. 2A through 2D are, respectively, side views according to the sight lines IIA-IIA through IID-IID in FIG. 1.

DESCRIPTION OF THE PREFERRED EMBODIMENTS

Figure 1:
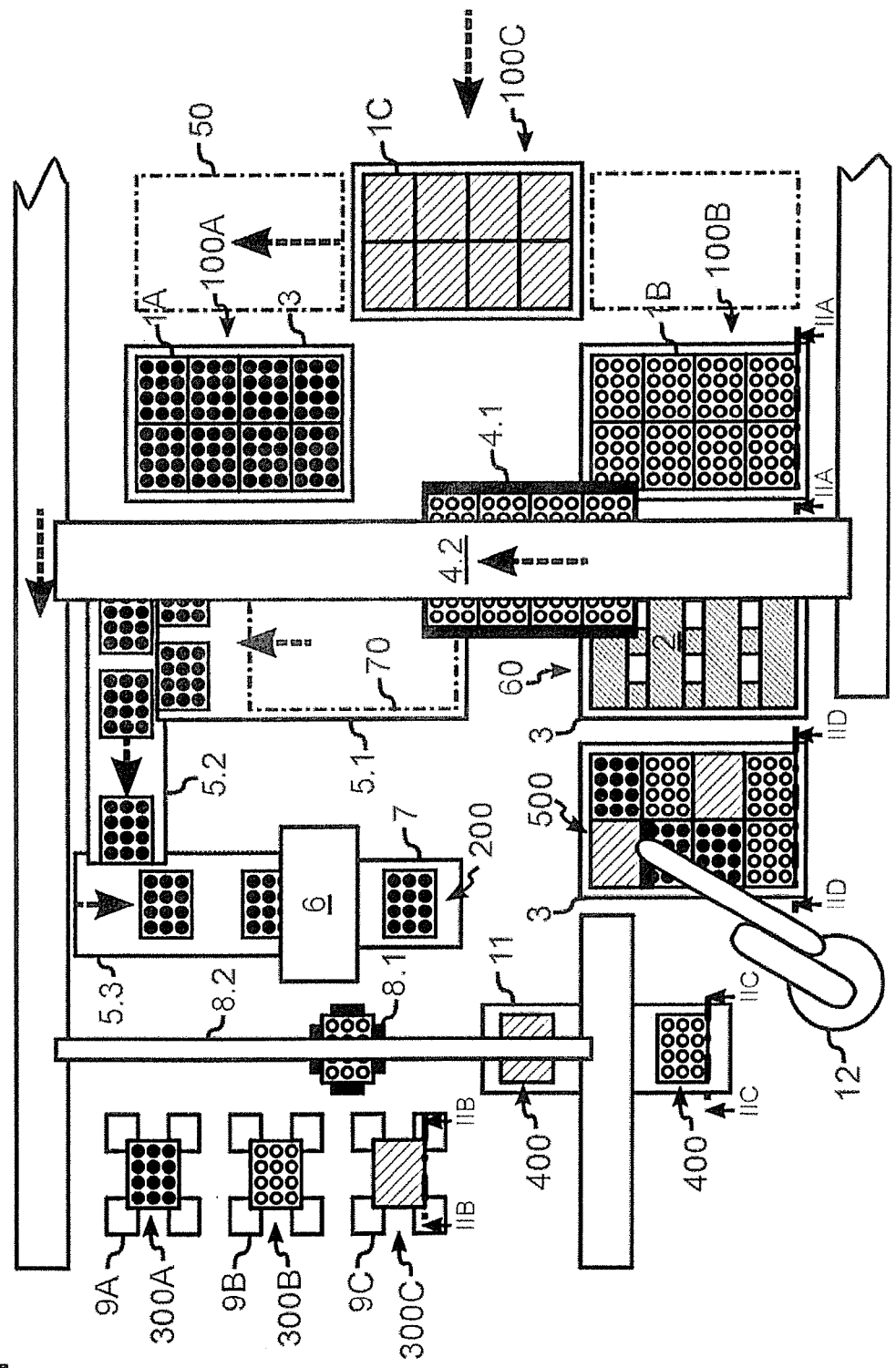
FIG. 1 schematically illustrates a device for automated commissioning of bundles in the implementation of a method according to one embodiment of the present invention in plan view.

FIG. 1 shows a device or automated commissioning of bundles in the implementation of a method according to one embodiment of the present invention from above.

Homogeneous full palettes 100A, 100B or, respectively, 100C as source palettes are delivered from a high rise rack or block storage directly or—in order to increase the availability—via a buffer storage (not shown) to a layer commissioning module (to the right in FIG. 1). The distribution to source palette storage positions 50 (indicated with a dash-dot line in FIG. 1) in the layer commissioning module takes place by means of displacement carts 3 (indicated by fat dashed lines in FIG. 1) onto which the source palettes 100A, . . . , 100C are deposited and that are moved by means of telescoping forks on travel paths to the storage positions (not shown).

As is in particular apparent in combination with the side view of FIG. 2A according to sight line IIA-IIA in FIG. 1, a homogeneous source palette 100B possesses multiple bundle layers 10B arranged vertically atop one another that respectively possess multiple bundles 1B of the same type and are arranged on a support 2 that for its part is situated on a displacement cart 3. Different bundle types 1A, 1B or, respectively, 1C, which can also differ in their size (in particular their footprint and/or height) are seen in FIG. 2A via empty or filled cylinders or bundle types indicated with hatching.

In operation at least one source palette at a fixed-assignment or (in particular capacity-optimized) selectable storage location is respectively provided for each type. It is similarly possible to continuously provide only more frequently commissioned types and/or to remove source palettes from the layer commissioning module again after removal of at least one bundle layer and to provide them again as needed.

A stacking location for empty supports 3 (not shown) as well as storage locations 60 for target palettes and a transfer station 70 of an individualization device 6 are additionally provided in the layer commissioning module.

A surface portal with at least one movable bridge 4.2 to which a movable layer gripper 4.1 is attached (which, for example, can be fashioned as a retractor or suction gripper) is arranged over the layer commissioning module. The horizontal travel paths of this portal piece conveyor 4 to handle bundle layers are indicated in turn by fat, dashed arrows in FIG. 1. Multiple grippers are preferably provided with action ranges overlapping with one another (not shown).

If one or more un-individualized, homogeneous bundle layers should be selectively palettized on a target palette (for example in order to palettize a rainbow palette or to subsequently fill a started palette with mixed bundles), a displacement cart 3 raises an empty palette 2 from an empty palette magazine (not shown) and deposits it at the storage position 60. The layer gripper 4.1 travels to the position of a source palette of the selected bundle type, picks up one or more bundle layers, travels to the target position 60 and deposits the layer(s) there.

If a lowermost bundle layer of a source palette is taken up by the layer gripper 4.1, the support 3 is also taken up below a loading plate by means of electrically operable hooks (not shown). The gripper 4.1 subsequently travels to the "Stack empty source palette supports" position and places the support there. The bundle layer remains in the gripper, will travel to the target position 60 and be deposited there. This reduces travel path and time of the gripper 4.1.

These processes are repeated until the desired homogeneous bundle layers are constructed on the target palette. This can subsequently be brought to a wrapper for packaging of the completed rainbow palette (not shown). It can similarly be brought as a starter palette into a robot cell (to the left in FIG. 1, next to position 60) and its individual bundles can be commissioned, as is explained in detail in the following. FIG. 2D shows an example of a mixed target palette 500 whose two lowermost layers were palettized homogeneously via per-layer palettizing with bundle layers of the source palettes 100B or, respectively, 100A. Conversely, a palette that was already partially palettized with mixed layers can naturally for its part be transported into target position 60 in order to efficiently palettize homogeneous intermediate or cover layers.

In particular given a large diversity of types, in a modification (not shown) one or more palette jacks can be used additionally (or instead of the displacement cart 3) in order to move the source palettes to their positions in the layer commissioning module. As was described in the preceding with reference to the layer gripper 4.1, these can be attached to movable bridges at the same or another surface portal and grip, lift, transport and deposit complete palettes (including their supports 2). In particular travel paths for displacement carts can therefore be done away with, such that the usable area of the layer commissioning module increases and its infeed and discharge can be implemented more flexibly and quickly.

With regard to the palettizing of an un-individualized bundle layer on a target palette, this can also selectively be individualized and magazined. For this the layer gripper 4.1 deposits the bundle layer at the transfer position 70. According to the invention, a layer commissioning thus always ensues first that alternately feeds a single commissioning. Alternating and process-optimized bundle layers of different source palettes 100A, . . . , 100C are thereby individualized and magazined as needed, for example depending on the fill degree or, respectively, refilling demand of magazine 9A through 9C (explained in detail in the following). In this way bundle layers remain in the source palettes until they are needed so that an individualization device 5 is alternately used for multiple bundle types as tailored to demand.

The layer gripper 4.1 deposits the bundle layer at the transfer position 70, wherein intermediate layers are possibly removed via an intermediate layer lifter and, for example, deposited in a skeleton container [palette cage] (not shown). The layer gripper has already individualized the bundle layer in a horizontal direction upon depositing it.

The individualization device 5 comprises three mesh chain conveyors 5.1, 5.2 and 5.3 oriented at corners and communicating with one another to additionally raise bundle layers at the transfer position 70 in individual bundles 1A.

The bundles are individually present at the continuous conveyor 5.3. To increase capacity for low bundles a stacking station 6 is provided in which multiple bundles (advantageously homogeneous bundles) are selectively stacked on one another and passed to a conveyor 7 that transports it into a reception region 200 of a portal conveyor 8 for magazining.

The portal conveyor 8 includes a column gripper 8.1 to take up one or more stacked bundles that are borne such that they can move on a movable portal 8.2. This receives the bundles or, respectively, bundle stacks in the reception region 200, wherein the column gripper 8.1 is filled via single or repeated transposition of bundles (bundle stacks) subsequently conveyed by the conveyors 7 in the reception region 200 and, subsequently stacked, is moved to corresponding magazines 9A, . . . , 9C that were manually adjusted to respective bundle sizes. In these the bundles are magazined in stacks into bundle stacks 300A, 300B or, respectively, 300C, as is shown by way of example in FIG. 2B.

Conversely, for mixed palettizing the gripper 8.1. or a corresponding gripper (that is controlled without collision with the gripper 8.1) approaches the magazines 9A, 9B or, respectively, 9C in predetermined palettizing sequences in order to take up successive bundles or bundle stacks. By successively approaching differently magazined bundle stacks 300A, . . . , 300C in a first stage the gripper can thus create mixed bundle stacks in that it thereby places the respective bundle of a different type that is already gripped in the approached magazine and adds one or more bundle layers from the approached magazine to the already collected, mixed bundle stack by grabbing deeper; a mixed bundle stack is thus "collected" from top to bottom from the magazines. The bundles mixed in such a manner advantageously possess gripping surfaces (in particular bases) corresponding to one another. The gripper deposits the collected bundle stacks on an additional conveyor 11.

Mixed bundle stacks can also be additionally (in a further stage) or alternatively assembled on a target palette before the mixed palettizing in that one or more grippers 81 successively deposit homogeneous bundles or bundle stacks from different magazines and/or previously mixed, collected bundle stacks atop one another on the conveyor 11 and thus generate pre-mixed bundle stacks 40 that are then moved by the conveyor 11 into a robot cell with a robot 12 that receives these and palettizes them on a mixed target palette 500 corresponding to the packing pattern.

FIG. 2C shows an example of such a pre-mixed bundle stack 400 on the conveyor 11 that was generated in that the column gripper 8.1 has initially received a bundle 1C from the magazine 9C and has deposited it on the conveyor. For illustration the capacity of the gripper 8.1 in the exemplary embodiment is two unit heights, wherein bundles 1A, 1B exhibit one unit height, bundle 10 exhibit two unit heights, such that the gripper 8.1 can selectively at most take up one bundle 10 or two stacked bundles 1A/B. After depositing the bundle 10 on the conveyor 11 the gripper 8.1 therefore initially approaches the bundle stack 300B, there picks up a bundle 10 and subsequently connects from the bundle stack 300A a bundle 1A from below before it deposits this two-stack 1A-1B on the bundle 10 on the conveyor so that the robot 12 can grip this mixed three-stack 1C-1A-1B and palettize it on the target palette 500.

FIG. 2D shows this from the side. It is apparent that two homogeneous bundle layers have initially been deposited in the manner explained above on the support 2 delivered into the robot cell via a displacement cart 3, in that the layer gripper 4.1 has raised these from the source palettes 100A or, respectively, 100B and completely deposited them on the support 2 or, respectively, the cover layer before the rainbow palette (as a starter palette) is started into the robot cell and there is additionally palletized with horizontally mixed stacks (for example the stack 400).

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for automated commissioning of bundles, comprising the steps of:
   providing a plurality of different source palettes respectively having different bundles loaded thereon in bundle layers;
   providing a target palette;
   transferring selected bundles from said different source palettes to said target palette with an automated commissioning device;
   from a computerized control unit, operating said commissioning device to control the transfer of said bundles by directly individualizing and magazining of respective bundle layers respectively from said different source palettes before palettizing the target palette, to produce individualized bundle layers and implementing said direct individualizing and magazining according to at least one procedure selected from the group consisting of alternating transferal of said selected bundles from respective, different source palettes, and a variable pre-definition of selected bundles that are transferred; and
   palettizing said target palette with at least one of said individualized bundle layers.

2. A method as claimed in claim 1 comprising magazining said bundle layers by stacking said bundle layers.

3. A method as claimed in claim 1 comprising demagazining the magazined bundle layers before palettizing said target palette.

4. A method as claimed in claim 1 comprising demagazining said bundle layers by stacking said bundle layers.

5. A method as claimed in claim 1 comprising providing said different source palettes with bundle layers that are each homogenous.

6. A method as claimed in claim 5 comprising providing said different source palettes with the homogenous layers in the respective different source palettes being identical.

7. A method as claimed in claim 5 comprising providing said different source palettes each with a mixture of different homogenous layers.

8. A method as claimed in claim 1 comprising providing said different source palettes relative to said automated commissioning device in a configuration selected from the group consisting of horizontally, in succession, and in alternation.

9. A method as claimed in claim 1 comprising handling said different source palettes and said target palette and said bundles and bundle layers thereon according to a technique selected from the group consisting of floor techniques and portal conveyor techniques.

10. A system for automated commissioning of bundles, for use with a plurality of different source palettes respectively having different bundles loaded thereon in bundle layers, and comprising:
    a target palette,
    an automated commissioning device that transfers selected bundles from said different source palettes to said target palette;
    a computerized control unit configured to operate said commissioning device to control the transfer of said bundles by directly individualizing and magazining of respective bundle layers respectively from said different source palettes before palettizing the target palette, said computerized control unit being configured to implement said direct individualizing and magazining according to at least one procedure selected from the group consisting of alternating transferal of said selected bundles from respective, different source palettes, and a variable predefinition of selected bundles that are transferred to produce individualized bundle layers; and said computerized control unit being configured to operate said commissioning device to palettize said target palette with at least one of said individualized bundle layers.

11. A system as claimed in claim 10 wherein said computerized control unit is configured to operate said commissioning device to magazine said bundle layers by stacking said bundle layers.

12. A system as claimed in claim 10 wherein said computerized control unit is configured to operate said commissioning device to demagazine the magazined bundle layers before palettizing said target palette.

13. A system as claimed in claim 10 wherein said automatic commissioning device comprises a robotic manipulator.

14. A system as claimed in claim 10 wherein said automated commissioning device comprises at least one of a portal device and a continuous conveyor.

15. A system as claimed in claim 10 wherein said automated commissioning device comprises at least one of a stacking station and a column gripper.

16. A system as claimed in claim 10 wherein said computerized control unit is configured to implement said individualizing and magazining based on said variable predefinition, and wherein said variable predefinition is at least one variable predefinition selected from the group consisting of a user input and a fill degree of a magazine.

17. A method as claimed in claim 1 comprising implementing said individualizing and magazining by said variable predefinition, and selecting said variable predefinition from the group consisting of user input and degree of filling of a magazine.

18. A method as claimed in claim 1 comprising providing at least one homogenous source palette among said plurality of different source palettes.

19. A method as claimed in claim 1 comprising palettizing said target palette to produce a mixed target palette.

* * * * *